United States Patent [19]

Lindsay

[11] Patent Number: 4,877,448
[45] Date of Patent: Oct. 31, 1989

[54] PROCESS FOR RECOVERY OF FREE ALUMINUM FROM ALUMINUM DROSS OR ALUMINUM SCRAP USING PLASMA ENERGY

[75] Inventor: Richard D. Lindsay, Raleigh, N.C.

[73] Assignee: Plasma Energy Corporation, Raleigh, N.C.

[21] Appl. No.: 281,049

[22] Filed: Dec. 8, 1988

[51] Int. Cl.$^4$ .................. C22B 21/00; C22B 4/00
[52] U.S. Cl. ........................... 75/10.21; 75/24; 75/68 R
[58] Field of Search ............ 75/24, 68 R, 10.21, 75/44 S

[56] References Cited

U.S. PATENT DOCUMENTS

| | | | |
|---|---|---|---|
| 4,177,060 | 12/1979 | Tylko | 75/10.21 |
| 4,606,760 | 8/1986 | Fritz | 75/44 S |
| 4,681,626 | 7/1987 | Fujishige | 75/24 |
| 4,780,132 | 10/1988 | Dighe | 75/44 S |

*Primary Examiner*—Peter D. Rosenberg
*Attorney, Agent, or Firm*—A. W. Breiner

[57] ABSTRACT

A process for recovering free aluminum and aluminum compounds such as aluminum oxide from aluminum dross and aluminum scrap in a furnace heated with a plasma arc torch wherein air is utilized as the arc gas is described. The use of air as the arc gas provides greater heat output per kilowatt hour of electricity and provides for greater dross throughput. Moreover, the process is ecologically safe.

6 Claims, 3 Drawing Sheets

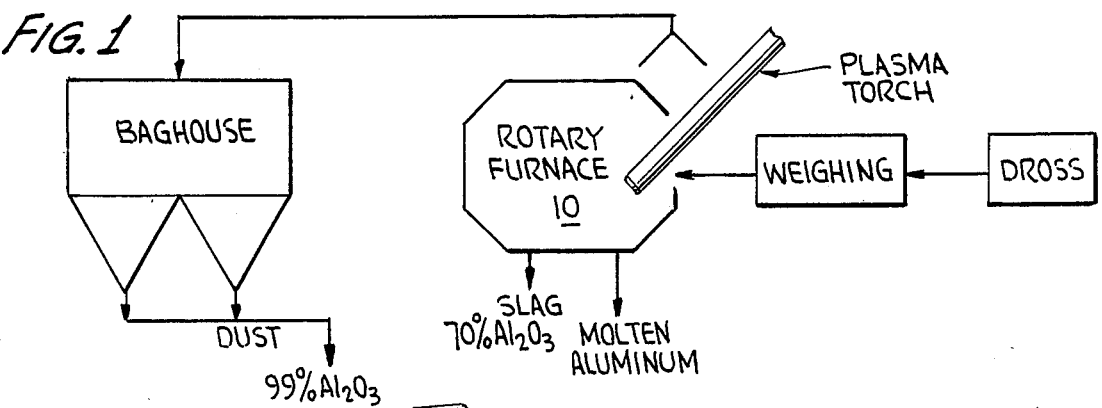
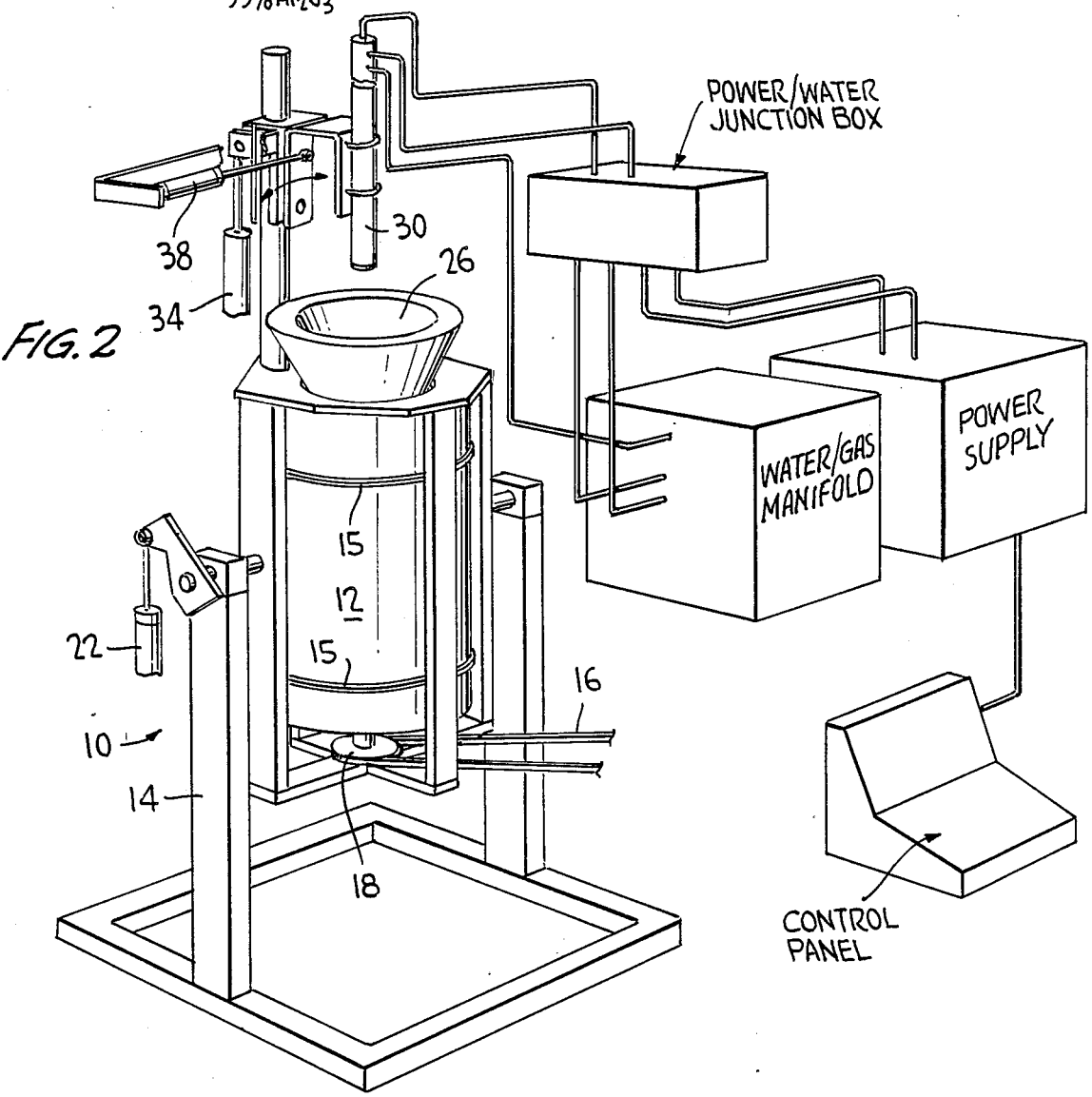

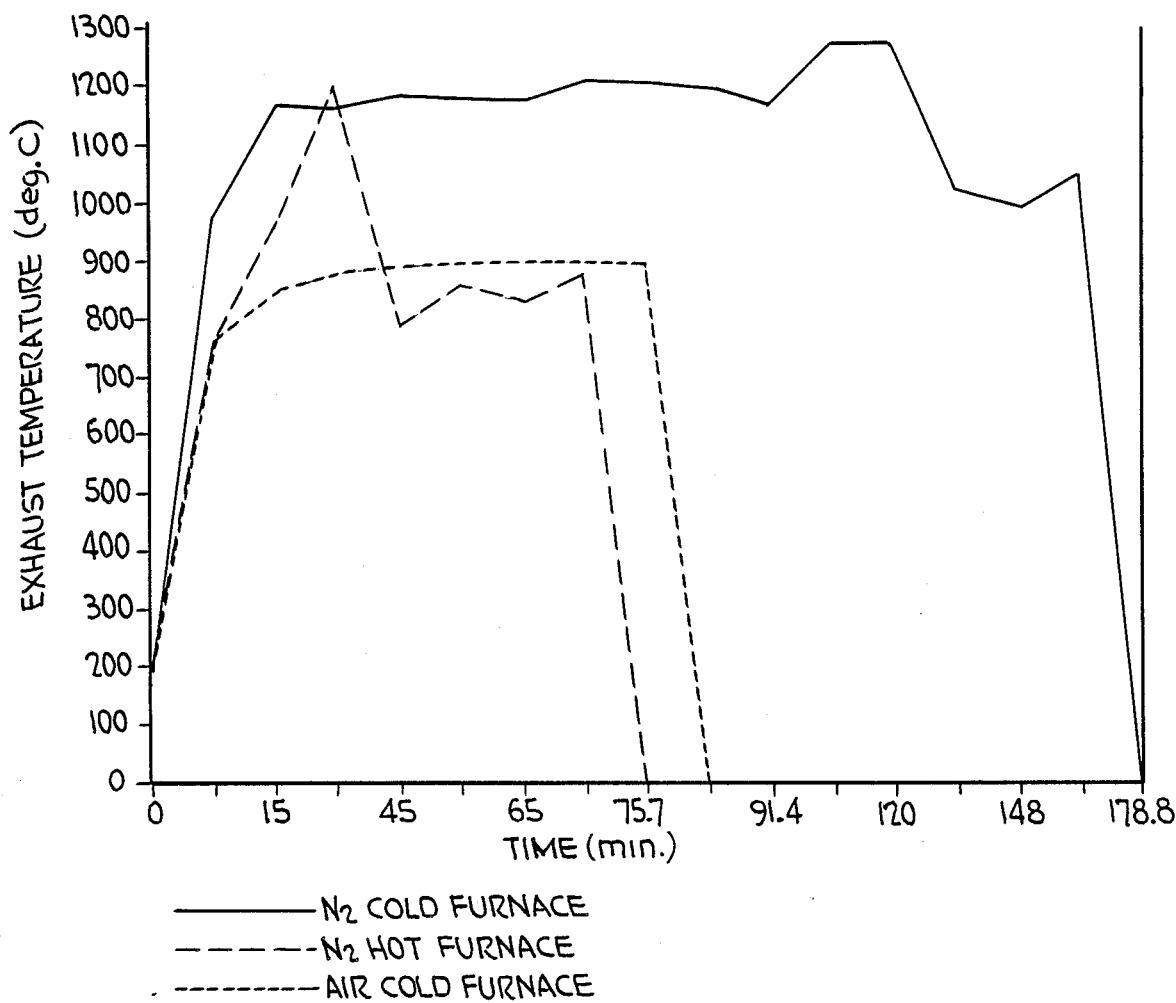

PROCESS FOR RECOVERY OF FREE ALUMINUM FROM ALUMINUM DROSS OR ALUMINUM SCRAP USING PLASMA ENERGY

FIELD OF INVENTION

This invention relates to the recovery of aluminum from aluminum dross or aluminum scrap, such as aluminum cans, using a plasma arc torch. More particularly, the invention relates to a process for the recovery of aluminum metal from aluminum dross and aluminum scrap in a furnace heated with a plasma arc torch operated on air, or other oxidizing gas, as the arc gas. Surprisingly, air or other oxidizing gas not only does not adversely influence the aluminum recovery through oxidation and burning of the aluminum as would be expected, but it greatly increases the efficiency of energy consumption and overall operation.

BACKGROUND OF INVENTION

When a body of aluminum is melted in a furnace for purposes of casting or the like, dross forms on the surface of the molten aluminum which must be periodically removed, for example by skimming or similar operation. The removed dross contains substantial amounts of free aluminum as well as aluminum oxides, such as bauxite, and certain other metals and metal salts, such as magnesium, manganese, and lithium depending on the nature of the aluminum or aluminum alloy being treated.

It is recognized in the industry that for economical reasons it is critical to recover in usable form the free aluminum, aluminum oxide, and other by-product metals from the dross. It is also recognized, however, that the recovery of these materials from dross is difficult due, inter alia, to the nature of the dross and the reactivity of aluminum. In a typical recovery process the dross is normally melted at high temperatures in a furnace. However, at elevated temperatures the dross, particularly the free aluminum in the dross, is easily susceptible to oxidation and, moreover, commonly tends to ignite and burn in the presence of air. The burning of the aluminum can decrease substantially the amount of aluminum recovered. To solve the problems associated with treating dross and improve the efficiency of aluminum recovery, it has been proposed to heat the dross in an induction furnace in the presence of a salt flux. See, for example, McLeod et al, U.S. Pat. No. 3,676,105.

The art also recognizes that similar problems are encountered when recovering free aluminum from aluminum scrap such as aluminum cans or other scrap material. See, for example, Bamji et al, U.S. Pat. No. 4,571,258.

It has also been suggested in the prior art to recover aluminum metal in the gaseous state by breaking down aluminum salts at temperatures of at least 2500° to 5500° C. using plasma energy from a plasma arc torch. In this operation the need to protect against the problems associated with oxidation and burning of the aluminum are recognized. See, for example, Othmer, U.S. Patent No. 3,938,988.

The use of a plasma jet generator has also been suggested for reducing various metal oxides, including aluminum oxides, which melt at a temperature below the boiling point of the metal to be recovered. It is stated that the gas which is energized in the plasma jet generator is an inert gas such as helium, neon, xenon, krypton, or nitrogen.

Accordingly, there is a substantial need in the industry for an improved process for recovering free aluminum, aluminum compounds such as the aluminum oxides, and by-product metals from aluminum dross and from aluminum scrap. It is particularly desirable that such process be ecologically safe and not contaminate the environment.

SUMMARY OF INVENTION

The present invention provides a process for the recovery of free aluminum and aluminum oxides from aluminum dross and aluminum scrap (hereinafter, for convenience, collectively referred to as "dross" or "aluminum dross") comprising heating the dross in a high temperature furnace using a plasma arc torch fed with air, or other oxidizing gas such as a mixture of air and oxygen or air and nitrogen as the arc gas. The use of air as the arc gas, in comparison to nitrogen (1) provides 40% more heat output with the same electrical input (KW/hr), resulting in a shorter processing time and substantially higher throughputs, approximately two times the throughput;
(2) provides reduced nitride formation since the hottest part of plasma which is closest to the torch is oxidizing, not nitriding;
(3) provides an oxide, $Al_2O_3$, which is stable and not an environmental problem in contrast to a nitride which is produced with nitrogen which is unstable and is an environmental problem; and
(4) is more economical since air is much cheaper than nitrogen or argon, or any other available inert arc gas.

Specifically, for one megawatt electrical power input and 100 SCFM (standard cubic foot per minute) air plasma gas input, the calculations are as follows:

$$\frac{100 \text{ SCFM Air} \times 0.2 \text{ (O}_2)}{379 \text{ SCF/\#-Mole}} \times 60 \frac{\text{Min}}{\text{Hr}} = 3.166 \frac{\text{\#-Mole}}{\text{Hr}}$$

$$3.166 \text{ \#-Mole} \times \frac{32\#}{\text{\#-Mole}} = 101.34\# \text{ of } O_2$$

$$2 Al + 3/2 O_2 \rightarrow 1 Al_2O_3$$

3.166 #-Mole of $O_2$ consumes 4.221 #-Mole of Al $$4.221 \text{ \#-Mole Al} = \frac{27\#}{\text{\#-Mole}} \times 4.221 \text{ \#-Mole} = 113.97\# \text{ of}$$

aluminum which is burned to $Al_2O_3$.

For a 2.5 ton batch of dross at 50% aluminum content which is melted in one hour only 4.6% of the aluminum is oxidized, i.e., $$\frac{113.97\# \text{ Al Oxidized}}{2500\# \text{ Al available}} = 4.6\% \text{ of Al}$$

The 4.6% of oxidized aluminum is fixed for a constant torch enthalpy of 10 KW/SFM, a constant aluminum content of 50%, and a constant system heat efficiency resulting in 2500 pounds of aluminum melted in one hour at a one megawatt input electrical rate. An array of oxidization percent can be generated from independent variables of enthalpy, heat efficiency, and aluminum content.

Proof that there is an added 40% ± heat input is apparent from heat formation data as follows:

$$2.110 \text{ \#-Mole Al}_2\text{O}_3 \times \frac{399.09 \text{ KCal}}{\text{\#-Mole}} \times$$

$$\frac{1800(\text{\#-Mole})(\text{BTU})}{(\text{\#-Mole})(\text{KCal})} =$$

$$\frac{1,515,743 \text{ BTU/hr}}{3413 \text{ BTU/hr/KW/hr}} = 444 \text{ KW/hr}$$

Air, therefore, results in a total heat release of 1.444 megawatts at one megawatt of electrical output to provide a 40% enhanced heat input.

Proof of the cost effectiveness is shown by the following:

$$N_2 \text{ Cost} = \$30/\text{hr} \frac{100 \text{ SCFM} \times 60 \text{ Min}}{1000} \times \frac{\$5}{1000}$$

$$\text{Ar Cost} = \$150/\text{hr} \frac{100 \text{ SCFM} \times 60 \text{ Min}}{1000} \times \frac{\$25}{1000}$$

Air Cost = $8/hr AT Power Cost of $.06/KW/hr

When treating aluminum alloys containing more active metals than aluminum such as magnesium, lithium, etc., magnesium and lithium will be oxidized first and result in consumption of these metals first, resulting in less aluminum loss and similar heat output advantages.

The ability to use air as the arc gas and the enhanced results obtained are surprising. It was to be expected that the preferred gas would be nitrogen or other non-oxidizing gas such as argon, neon, and the like so as to avoid oxidation and burning of the aluminum as would be expected to occur in the presence of air. However, it was found that when using nitrogen as the arc gas nitriding occurred, causing difficulty in the operation of the torch and in substantial loss of aluminum; whereas air not only did not burn to any substantial degree, but provided highly beneficial results.

Excessive oxidation of the aluminum does not occur when air is used as the arc gas because of the very limited amount of air admitted through the plasma torch; and, accordingly, the aluminum burning is controlled. The loss of aluminum is lower than that lost due to nitriding with nitrogen as the arc gas, and additionally increased heat output with the same electrical KW/hr input is obtained. This, in turn, results in the shorter processing time and substantially higher, approximately twice, dross throughput.

THE DRAWING AND DETAILED DESCRIPTION

A presently preferred embodiment will be described in reference to the drawing wherein FIG. 1 is a flow diagram of the process of the present invention;

FIG. 2 is a schematic drawing of the furnace, plasma arc torch, and supply system used in the process of this invention;

FIG. 5 is a comparative temperature profile using air and nitrogen as the arc gas.

Referring to FIG. 1, in the process of the present invention dross is weighed and charged into a furnace 10. After charging the dross to the furnace, a plasma arc torch 30 is brought into position in the furnace and the dross heated to the molten state. The molten free aluminum is recovered. The dust recovered from the furnace which is about 99% aluminum oxide is passed to a bag house. The slag which forms on the furnace walls is scraped from the furnace and is preferably recharged to the furnace with additional dross.

Figure 3:
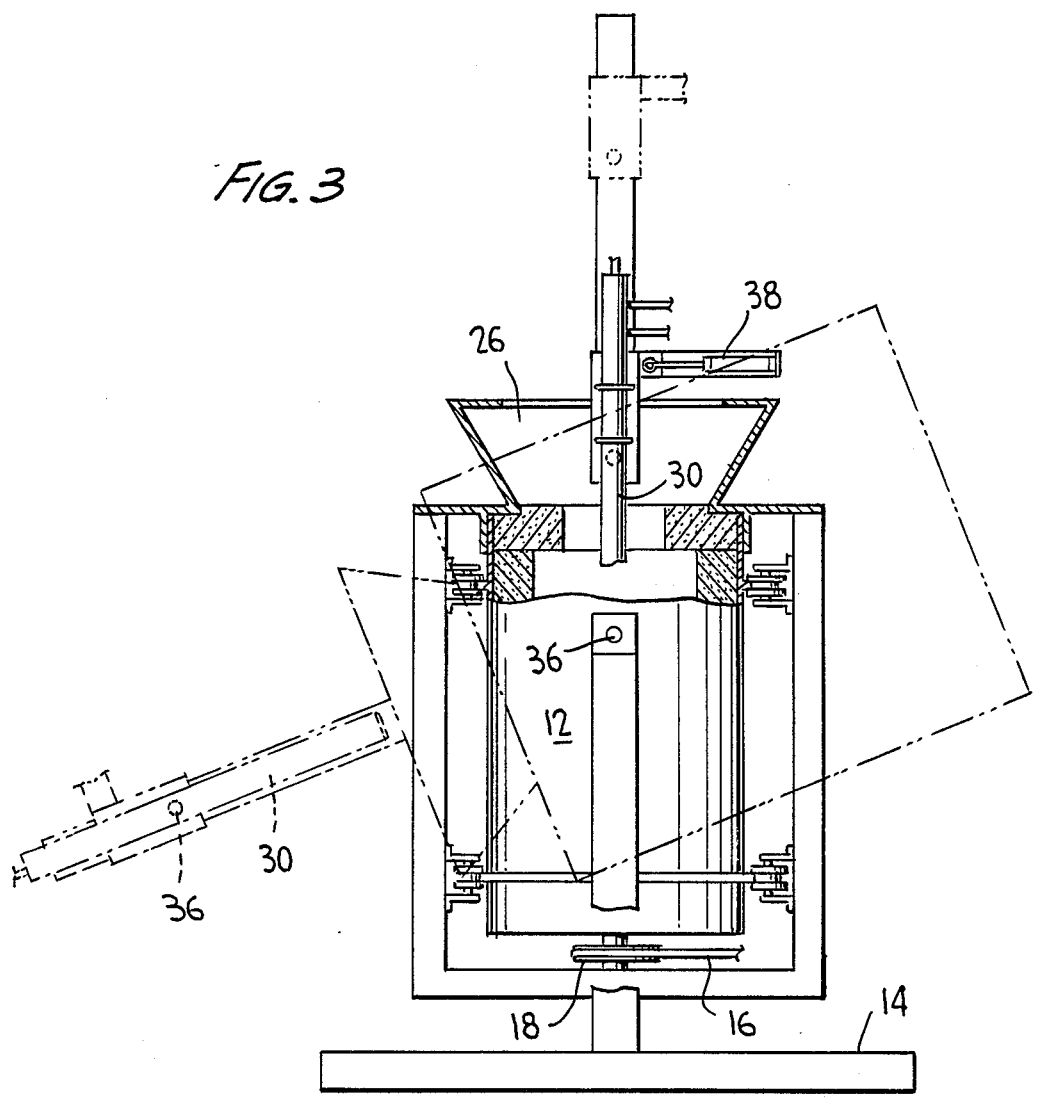
FIG. 3 is a side elevational view of the furnace and plasma torch shown in FIG. 2.

The preferred furnace, as shown in FIGS. 2 and 3, is a tilting, rotating furnace. Thus, the furnace comprises a rotating drum 12 on frame 14 which is driven on rails 15 by belt 16 and pulley 18 with an electric motor (not shown). As is also shown in FIGS. 2 and 3, the drum, carrying torch 30, tilts about pivot point 20 actuated by an air cylinder 22 to permit convenient recovery of the aluminum. Accordingly, the supply lines to the plasma torch must be flexible.

Plasma torch 30 is removably positioned in cover 26 of furnace 10. The torch on frame 22 is moved vertically into and out of position by an air cylinder 34. Once in position in the furnace, the torch can be swung back and forth within the furnace in order to cover the entire furnace area around pivot point 36 by activation of air cylinder 38. The torch is positioned independent of drum 12 to permit rotation of the drum.

Figure 4:
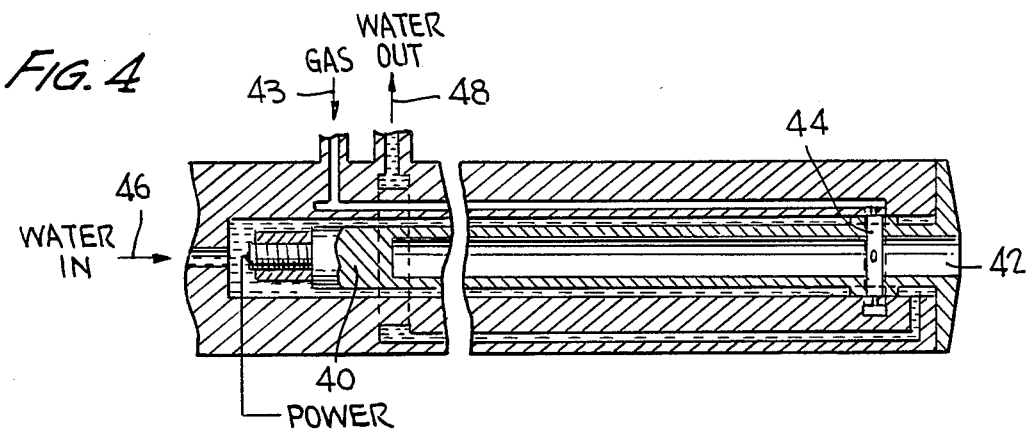
FIG. 4 is a schematic cross-section of the plasma arc torch used in the present invention.

Plasma torches which are operable in the process of the invention are of the transfer and non-transfer type commercially available from Plasma Energy Corporation, Raleigh, North Carolina, assignee of the present invention. Suitable torches are also described in Camacho, U.S. Pat. No. 4,383,820; and Camacho et al, U.S. Patent No. 4,559,439. A simplified cross-section of a suitable transfer arc torch is shown in FIG. 4 of the drawing. As illustrated, the torch designed for operating in the transferred arc mode includes an electrode 40, a collimator 42, a vortex generator 44, water input means 46 for cooling the torch mechanism, and a water output means 48. Gas input means 43 feeds gas to the vortex generator 44 between electrode 40 and collimator 42. In the plasma generator system the furnace base and the dross being heated function as the ground for receiving the transferred arc from electrode 40. As shown in FIG. 1, the water/gas manifold and the electrical power supply for the torch are supplied to a power/water junction box and then fed to the torch. The air arc gas is ionized between the vortex generator and the collimator.

The invention will be more specifically defined by the following examples:

EXAMPLE 1

2.5 tons (5000 pounds) of aluminum alloy dross containing approximately 50% aluminum was charged into rotating furnace 10. A PT250N non-transferred arc plasma torch 30 manufactured by the Plasma Energy Corporation was lowered into position and directed by air cylinder 38 to contact substantially the center of the bottom of furnace drum 12. Electrical power, coolant water, and air arc gas were supplied to torch 30. With rotation of the furnace drum 12, the charge was heated to the molten condition, and thereafter the heating was continued for a period of one hour. The torch was then withdrawn and the molten aluminum discharged by tilting the furnace drum. The 5000 pound charge produced 2375 pounds of pure alloy aluminum. The slag was scraped from the bottom of the drum to provide 2740 pounds aluminum oxide. Additionally, 100 pounds aluminum oxide was recovered from the bag house. The increase in total weight is due to the oxygen present in the form of oxides. The cost of air used was $8, and the cost of electricity based on $0.06 KW/hr was $60.

EXAMPLE 2

The process of Example 1 was repeated. However, in this instance the arc gas was nitrogen. For a two-hour reaction time, i.e., twice the time used with air as the arc gas, the recovery was as follows: 2200 pounds pure alloy aluminum; 2740 pounds slag, and 50 pounds of dust. The cost of nitrogen used was $60, and the cost of electricity based on $0.06 KW/hr was $120. Additionally, there is an added advantage in fixed operating costs, such as manpower, when operating on air.

The advantages of using air as the arc gas is further shown by the comparative temperature profile set forth in FIG. 5. As seen from FIG. 5, when starting with a cold furnace and nitrogen as the arc gas, the heating cycle required 178 minutes, with the maximum exhaust temperature approaching 1200° C. In contradistinction, when operating with air with a cold furnace, the maximum temperature of approximately 850° C was reached in approximately 80 minutes. This is similar to the temperature profile obtained with nitrogen on a hot furnace.

In the aforesaid examples, the aluminum recovery was from aluminum dross. Similar results, however, are obtained when recovering aluminum from aluminum scrap such as aluminum cans. Additionally, although air is the preferred oxidizing arc gas because of its economy, it is possible to use other oxidizing arc gases including oxygen, mixtures of oxygen and air, or mixtures of air and nitrogen.

As will be apparent to one skilled in the art, various modifications can be made within the scope of the aforesaid description. Such modifications being within the ability of one skilled in the art form a part of the present invention and are embraced by the appended claims.

It Is Claimed:

1. A process of recovering free aluminum from aluminum dross or aluminum scrap comprising charging aluminum dross or aluminum scrap to a furnace equipped with a plasma arc torch for heating said charge; heating said charge by providing plasma energy to said charge which plasma energy is generated by feeding air to said torch for ionization; continuing said heating until said charge is molten, and removing free aluminum in the molten state from said furnace.

2. The process of claim 1 wherein said air is mixed with nitrogen.

3. The process of claim 1 wherein said air is mixed with oxygen.

4. The process of claim 1 wherein said furnace has a rotating drum and said drum is rotated during said heating.

5. The process of claim 1 wherein the process is a batch operation.

6. The process of claim 1 wherein the process is a continuous operation with periodic tapping of the furnace to remove the free aluminum.

* * * * *